US009004901B2

(12) United States Patent
Wilson

(10) Patent No.: US 9,004,901 B2
(45) Date of Patent: Apr. 14, 2015

(54) APPARATUS FOR CASTING A NON-PNEUMATIC TIRE

(75) Inventor: Brain D. Wilson, Greer, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/978,046

(22) PCT Filed: Jan. 6, 2011

(86) PCT No.: PCT/US2011/020299
§ 371 (c)(1),
(2), (4) Date: Jul. 2, 2013

(87) PCT Pub. No.: WO2012/094005
PCT Pub. Date: Jul. 12, 2012

(65) Prior Publication Data
US 2013/0287882 A1 Oct. 31, 2013

(51) Int. Cl.
B29D 30/02 (2006.01)
B29D 30/00 (2006.01)

(52) U.S. Cl.
CPC .............. B29D 30/00 (2013.01); B29D 30/02 (2013.01)

(58) Field of Classification Search
USPC ................. 425/28.1, 117, 425, 435
See application file for complete search history.

(56) References Cited

U.S. PATENT DOCUMENTS

| | | | |
|---|---|---|---|
| 3,298,066 A | 1/1967 | Soderquist | |
| 3,553,778 A | 1/1971 | Woodhall | |
| 4,276,012 A * | 6/1981 | Yang | 425/435 |
| 5,866,170 A | 2/1999 | Fujieda et al. | |
| 5,906,836 A * | 5/1999 | Panaroni et al. | 425/435 |
| 7,201,194 B2 | 4/2007 | Rhyne et al. | |
| 7,418,988 B2 | 9/2008 | Cron et al. | |

OTHER PUBLICATIONS

International Search Report with Written Opinion; dated Mar. 1, 2011.

* cited by examiner

Primary Examiner — James Mackey
(74) Attorney, Agent, or Firm — John Steckler Schwab

(57) ABSTRACT

This invention relates generally to an apparatus for casting a portion of a tire, and, more specifically, to an apparatus that has a cap and an outer ring that are rotatably attached to a fixed portion of the molding apparatus for centrifugally molding the spokes of a non-pneumatic tire from polyurethane or some other suitable material. The cap and outer ring have separate rotatable attachments to the apparatus and are not otherwise connected to each other, so they are free to rotate without obscuring the pouring slot of the mold.

15 Claims, 6 Drawing Sheets

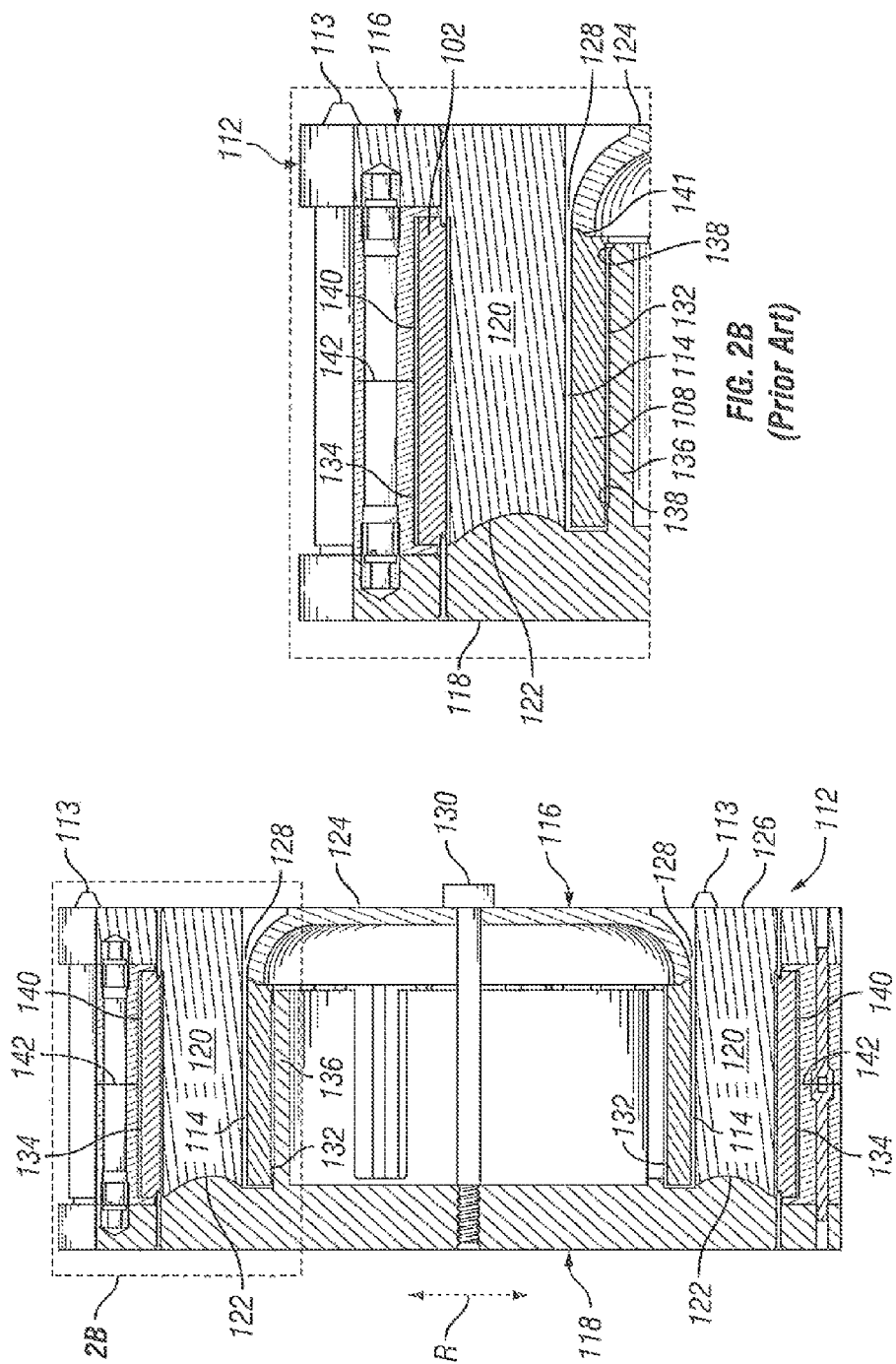

APPARATUS FOR CASTING A NON-PNEUMATIC TIRE

BACKGROUND OF THE INVENTION

1. Field of the Invention

This invention relates generally to an apparatus for rotationally casting a portion of a tire, and, more specifically, to an apparatus that has a cap and ail outer ring that are separately and rotatably attached to a molding apparatus with a pouring slot between them for centrifugally molding the spokes of a non-pneumatic tire from polyurethane or some other suitable material.

2. Description of the Related Art

An emerging field in tire development involves the manufacture and use of non-pneumatic or hybrid tires that do not depend solely on gas to support the tire structurally as these dyes are not prone to deflation, which can render standard pneumatic, tires inoperable. An example of such a tire is disclosed by U.S. Pat. No. 7,201,194, which is commonly owned by the applicant of the present application. The content of this patent is incorporated herein by reference for all purposes in its entirety. In an exemplary embodiment of the '194 patent, the non-pneumatic tire includes an outer annular shear band and a plurality of web spokes that extend transversely across and radially inward from the annular shear band and are anchored in a wheel or hub. In certain embodiments, the annular shear band may further comprise a shear layer, at least a first membrane adhered to the radially inward extent of the shear layer and at least a second membrane adhered to the radially outward extent of the shear layer. In addition to the ability to operate without a required inflation pressure, the invention of U.S. Pat. No. 7,201,194 also provides advantages that include a more uniform ground contact pressure throughout the length of the contact area. Hence, this tire mimics the performance of a pneumatic tire.

FIG. 1 shows such a tire that defines a radial direction R. For reference, all the reference numerals in the 100's used herein refer to the tire features and previous mold design while all reference numerals in the 200's used herein refer to a new and improved molding apparatus according to an embodiment of the present invention. The tire 100 comprises a tread 102 that is attached to the outward extent 104 of the spokes 106, which in turn, are connected to a hub or wheel 108 at their inward extent 110 by means known in the art such as by molding spokes between the hub 108 and the tread 102, which have been prepared for suitable bonding to the polyurethane. For the version of the tire 100 shown, the spokes 106 are formed by pouring as polyurethane liquid into a rotational mold where the liquid is spread via centrifugation and then cured or hardened, it can also be seen that the spokes 106 are grouped in pairs and that the individual spokes 106, 106'' within each pair are consistently spaced from each other and that each pair is spaced consistently from the adjacent pair around the circumference of the tire. The spacing within each pair and the spacing between each adjacent pair do not need to be the same. As described by the Abstract and col. 2, lines 28-41 of the '194 patent, the spokes 106 support the tire 100 in tension near the top of the tire 100 and not in compression. Instead, the spokes 106 at the bottom of the tire near the contact patch, which is where the tread 102 of the tire 100 contacts the road, compress or buckle easily. This helps the tire to simulate the pneumatic support function of a pneumatic tire.

Looking now at FIG. 2, a top view of as mold 112 according to a previous design is shown with the top portion 116 of the mold 112 in a translucent state so that the cavities 114 that form the spokes 106 of the tire 100 can be seen. It also defines a radial direction R that is the same as the radial direction as the tire whose spokes it manufactures, FIG. 2A, is a sectional view of the mold 112 taken along lines 2A-2A of FIG. 2. The mold 112 includes a bottom portion 118 that can be clamped onto a platen of a rotational molding turntable (not shown) by means commonly known in the art. The cavities 114 that form the spokes 106 are defined by interarticulating cores 120 that extend from the bottom and top portions 116, 118 of the mold 112 in an alternating pattern around the circumference of the mold 112. As best seen in FIG. 2A, two cores 120 located diametrically opposite of each other project down from the top portion 116 and shut off on slightly contoured surfaces 122 found on the bottom portion 118 of the mold 112 without projecting or telescoping into the bottom portion 118 of the mold 112. It is to be understood that similar cores extend from the bottom portion and shut off on slightly contoured surfaces found on the top portion of the mold due to the alternating arrangement of the cores. Taper pins 113 are also shown that are used for mold alignment when the mold halves are assembled. Sometimes, additional taper pins (not shown) are located on the ends of the cores that mate with pockets on the opposing mold half for fine tuning, the alignment of the cores.

Looking at both FIGS. 2 and 2A, the top portion 116 of the mold 112 includes a cap 124 that is centered with respect to the cylindrical shape of the mold 112 and an outer ring 126 that is concentric with the cap 124 when both components are attached to the bottom portion 118 of the mold 112. This arrangement creates a small gap or pouring slot 128 around the periphery of the cap 124 for introducing the polyurethane to form the spokes as will be discussed in more detail later. Both the outer ring 126 and the cap 124 can be attached and detached separately from the bottom portion 118 of the mold 112 using bolts 130, screws or other means commonly known in the art. Usually, the bolts 130 are found with their heads exposed from the exterior surface of the top portion 116 of the mold 112 to facilitate access for tightening and loosening the belts 130. Some common mold features such as vents for helping proper mold fill by allowing the escape of trapped gas are not discussed herein as they are not pertinent to the present invention. Also the cores are shown to be solid extensions of the mold halves 116, 118 but in actuality these are often separate inserts that are retained within the mold halves 116, 118 and that can be easily replaced should a core 120 be damaged.

The mold 112 can be used in the following manner to create the spokes 106 of the tire 100, as depicted by FIGS. 2A and 2B. First, the outer ring 126 and cap 124 of the top portion 116 of the mold 112 are removed so access to the inner annular pocket 132 of the bottom portion 118 of the mold 112, which is configured for receiving the hub or wheel 108 of the tire 100, and the outer annular slot 134 of the bottom portion 118 of the mold, which is configured for receiving the bottom half of the tread 102 of the tire 100, is possible. Then, the user places the hub 108 into the inner annular pocket 132 which has a ring shaped wall 136 that defines its radially innermost extent and that has chamfers 138 near its top and bottom for helping to properly locate the hub 108 so that it is concentric with the mold 112. In like fashion, the tread 102 is lowered into the outer annular slot 134 found in the bottom portion 118 of the mold and guided into a substantially concentric position with respect to the mold by alignment features (not shown).

Also as best seen in FIG. 211, once the hub 108 and tread 102 are properly positioned, the outer ring 126 is then placed into position so that its cores 120 are positioned between the cores of the bottom portion of the mold and so that its outer annular slot 140, which is substantially a mirror image of the outer annular slot 134 of the bottom portion 118 of the mold about its parting line 142, holds the remaining portion of the tread 102 that protrudes from the bottom portion 118 of the mold. Next, the cap 124 is centered with respect to the hub 108, and therefore with the mold as well, via its chamfer 141 as it is placed onto the hub 108. The outer ring 126 and cap 124 are then secured to the bottom portion 118 of the mold 112 as previously described. Finally, the mold 112 is rotated and heated polyurethane is poured into the mold by a nozzle (not shown) that is positioned directly above the pouring slot 128. This is possible since the pouring slot 128 is unobstructed as the mold 112 rotates. This slot leads to the cavities 114 that define the spokes 106. Centrifugation causes the polyurethane to fill out all of the spokes and the heat supplied to the mold is transferred to the liquid, helping the polyurethane to harden and cure by keeping it warm. The spokes 106 now extend from the hub 108 to the tread 102, allowing the spokes to bond to the hub and tread during the curing process.

Once the spokes 106 have cured, it is time for the tire 100 to be removed from the mold 112. First, the outer ring 126 is unfastened from the bottom portion 118 of the mold 112 and lifted vertically so that its cores 120 can disengage or demold from the spokes 106 that have just been created and so that the outer annular slot 140 of the top portion of the mold can break free of the tread 102 of the tire. It is advantageous to leave the cap 124 secured to the bottom portion 118 of the mold during this step as this keeps the hub 108 trapped, which is now connected to the tread 102 by way of the spokes 106, which in turn helps to keep the tire 100 attached to the bottom portion 118 of the mold 112 when the outer ring 124 is being removed. This helps to ensure that the tire remains on the bottom portion of the mold. This is desirable as lifting the outer ring with the tire attached is difficult to do by hand and removing the tire from the top portion of the mold when they are both elevated could be problematic. Once the outer ring 126 has been successfully removed, the cap 124 can then also be removed and the tire 100 is then free to be pulled out of the bottom portion 118 of the mold 112.

Thus, this apparatus necessitates a manufacturing process that is done primarily by manual means. For example, an operator needs to manually attach and detach the outer ring and cap of the mold in order to make the spokes for each tire because the top portions of the mold are not attached to a top platen of a molding press. This is too time consuming and costly to provide non-pneumatic or hybrid tires with their enhanced reliability, i.e. less downtime due to tire deflation, to consumers in an efficient and cost effective manner.

Accordingly, it is desirable to find an apparatus that allows such tires to be manufactured using a mold that has first and second portions that are attached to the first and second platens of a molding press, which allows the mold to be closed and opened automatically without human intervention, it would be particularly useful if such an apparatus could be designed to allow a liquid to be introduced into a mold without obstructing the liquid's path for filling the mold as the mold rotates. Finally, providing means for keeping the tire on a predetermined portion of the mold where an ejection system and/or tire handling system are provided would be desirable.

SUMMARY OF THE INVENTION

Particular embodiments of the present include an apparatus for molding a tire having a radial direction that includes a molding press and a mold. The molding press may have first and second platens that are operatively associated with the press for changing their position relative to each other for opening and closing a mold that is attached to the platens. The second platen may be rotationally attached to the apparatus. The mold may have its first portion attached to the first platen of the molding press and a second portion attached to the second platen of the molding press. The first portion of the mold may further comprise a cap that is rotatably attached to the apparatus and an outer ring that is also rotatably attached to the apparatus. The rotating cap and outer ring may be arranged concentrically with each other with a small gap between them that provides a pouring slot. The cap may have a rotatable attachment that is separate from that of the outer ring and the pouring slot may be accessible from the exterior of the apparatus when the mold is closed. The apparatus may also have a motor that is operatively associated with a portion of the mold for making said portion of the mold rotate.

In certain cases, the motor may drive the second portion of the mold and the cap and outer ring of the first portion of the mold may be coupled to the second portion of the mold when the mold is closed, causing the first portion of the mold to rotate.

In other embodiments, the apparatus may further include a gear that is attached to the second platen and a pinion that is driven by the motor, said pinion may be meshed with the gear for making the mold rotate.

Sometimes, the apparatus further comprises a slewing bearing that rotatably attaches the outer ring to the first platen of the molding press, in some cases, the rotatable attachment of the outer ring is located radially outside of the pouring slot.

In certain embodiments, the apparatus further includes roller bearings that rotatably attach the second platen and cap to the apparatus.

In still other embodiments, the apparatus may also include means for biasing the cap toward the second portion of the mold. Such means may include a spring.

In other embodiments, a mold portion may have a load bearing surface and the apparatus may further comprise a disc spring and a bolt with a head wherein the disc spring is trapped under the head of the bolt and presses on the load bearing surface.

In particular applications, the molding press may be vertical molding press and the first platen may be an upper platen and the second platen is a lower platen. The upper platen may include an opening that is above the pouring slot when the mold is closed. The upper platen may be pivotally connected to the molding press and the lower platen may be translatably connected to the molding press in as vertical direction. The apparatus may further include ejection pins that are attached to the floor below the lower platen and that can pass through the lower portion of the mold to eject the tire from the mold.

In other applications, taper pins may be used to couple the first mold portion toe the second mold portion when the mold is closed.

Typically, the apparatus may further include a nozzle that is positioned proximate the pouring slot for introducing a fluid, such as a gas, liquid and/or thermosetting material into the mold.

The apparatus may further comprise a frame and an arm that extends from the frame. The upper platen may include a central portion and an outer annular portion where the central portion is connected to the arm. The apparatus may further include a connecting member that connects the outer annular portion to the central portion of the upper platen.

The foregoing and other objects, features and advantages of the invention will be apparent from the following mote detailed descriptions of particular embodiments of the invention, as illustrated in the accompanying drawing wherein like reference numbers represent like parts of the invention.

BRIEF DESCRIPTION OF THE DRAWINGS

FIG. 2A is a sectional view of the mold of FIG. 2 taken along lines 2A-2A thereof with the tread and hub or wheel of a tire placed into the mold;

FIG. 2B is an enlarged view of the top portion of FIG. 2A showing the mold ready to form the spokes of time tire after the tread and hub have been installed;

DETAILED DESCRIPTION OF PARTICULAR EMBODIMENTS

Figure 1:
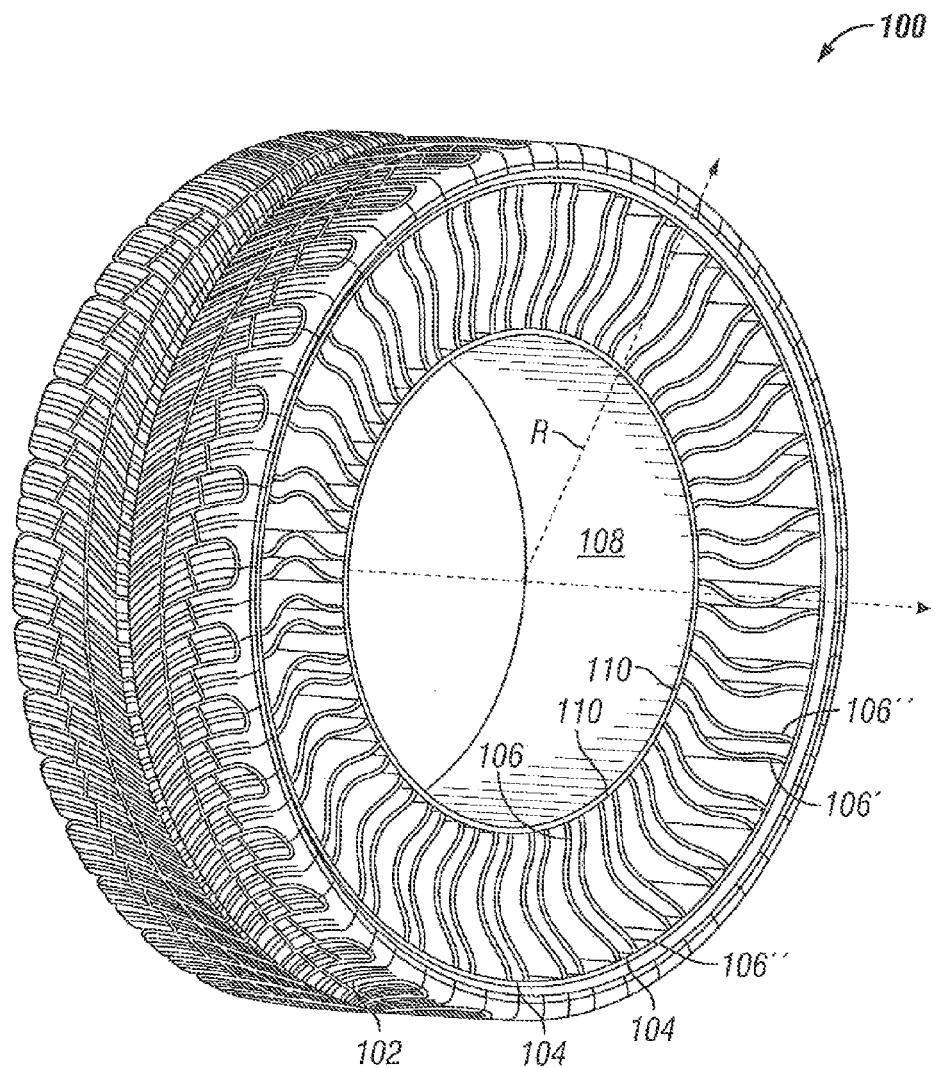
FIG. 1 is a perspective view of a non-pneumatic tire that has spokes that can be molded using an apparatus according to an embodiment of the present invention.
Figure 2:
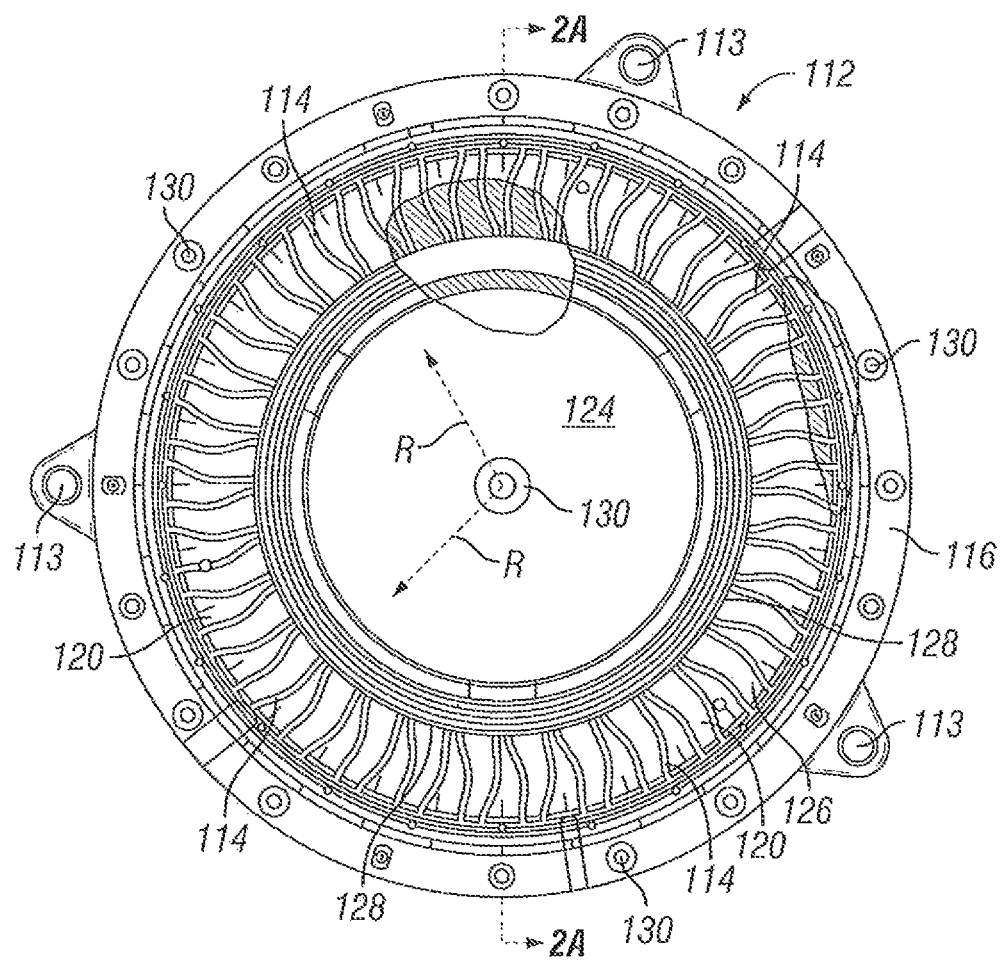
FIG. 2 is a top view of a previous mold design used to make a pneumatic ire similar to what is shown in FIG. 1.
Figure 3:
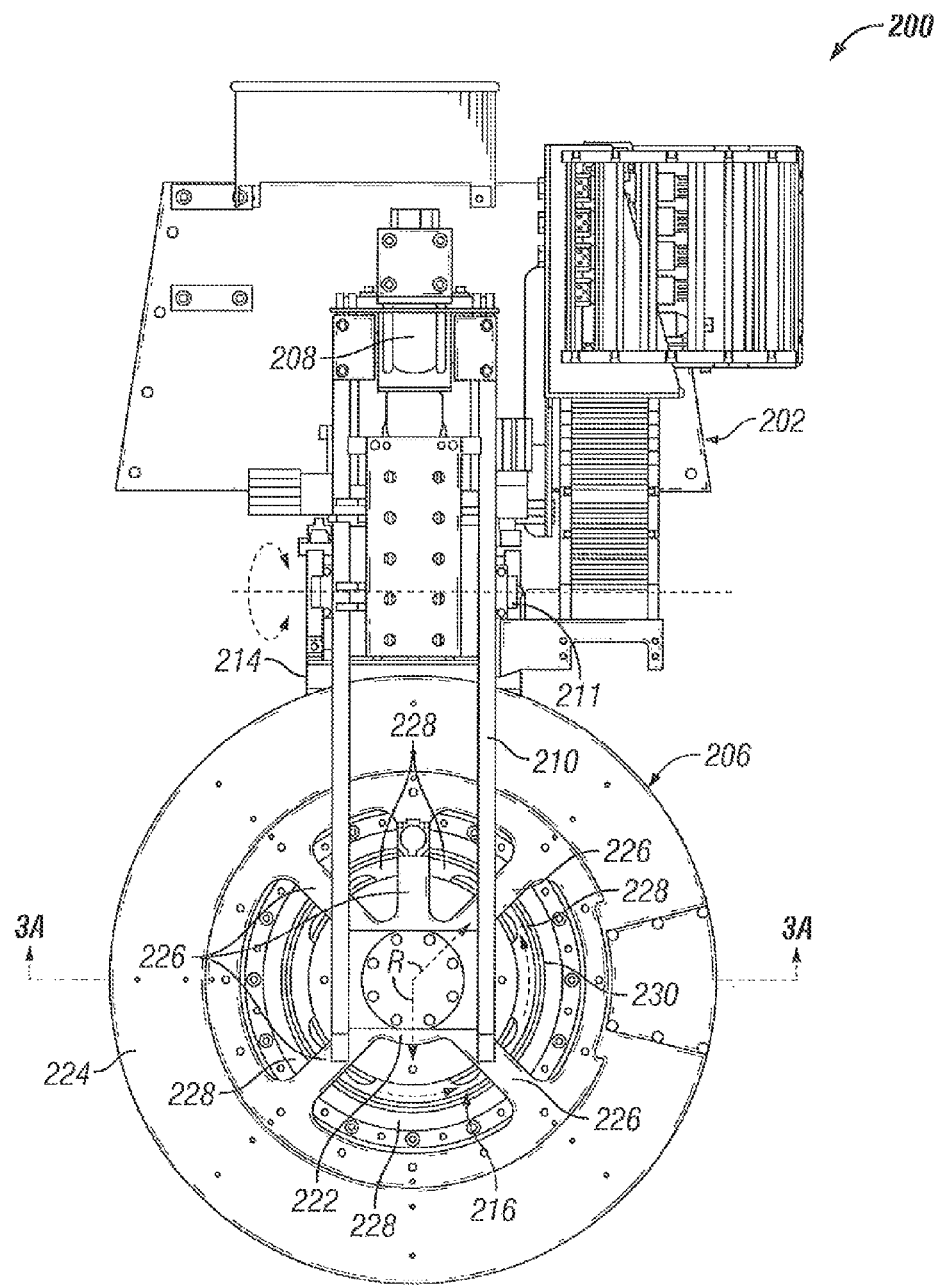
FIG. 3 is a top view of a molding apparatus according to a first embodiment of the present invention.
Figure 3A:
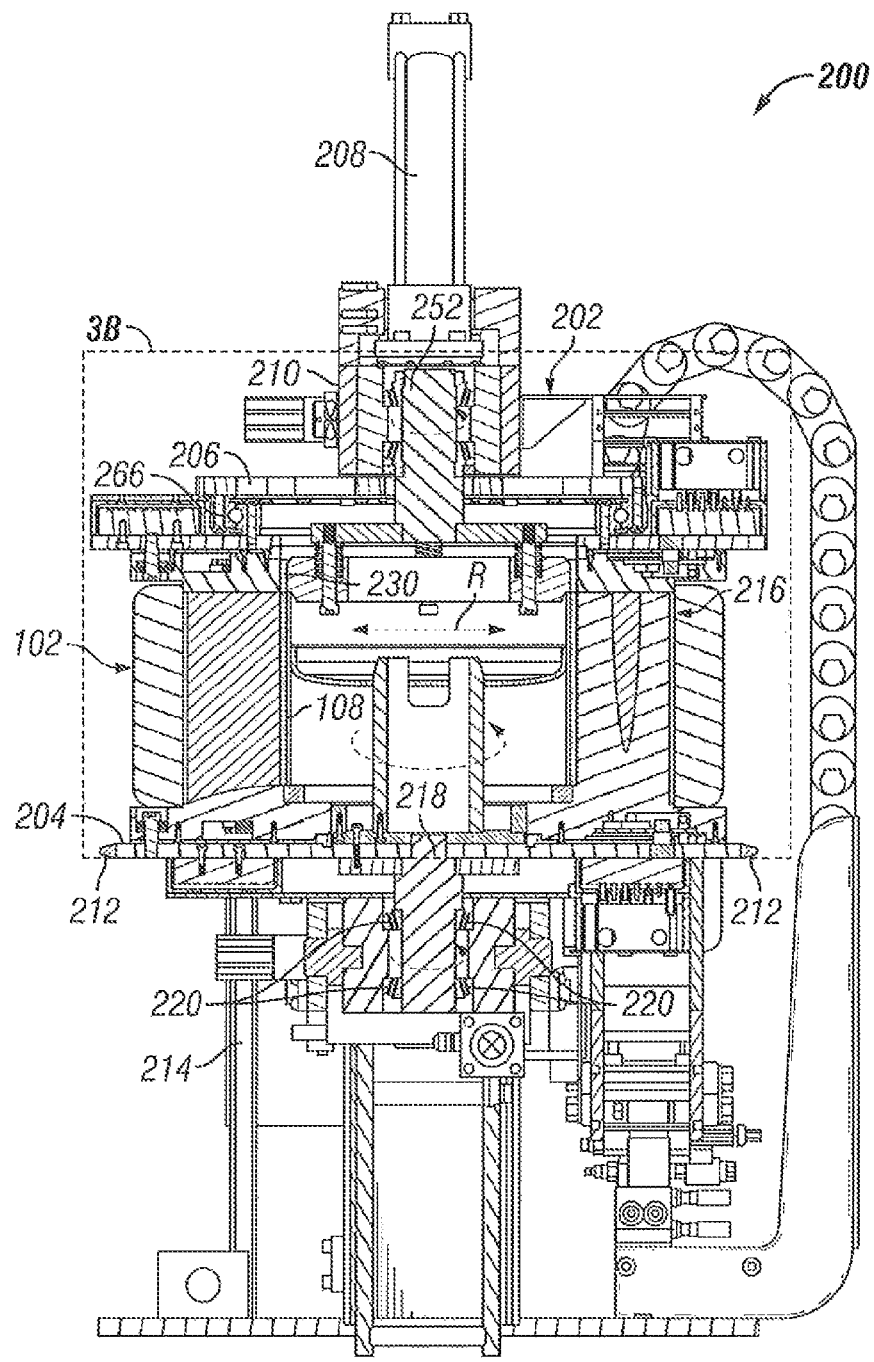
FIG. 3A is sectional view of the molding apparatus of FIG. 3 taken along lines 3A-3A thereof.
Figure 3B:
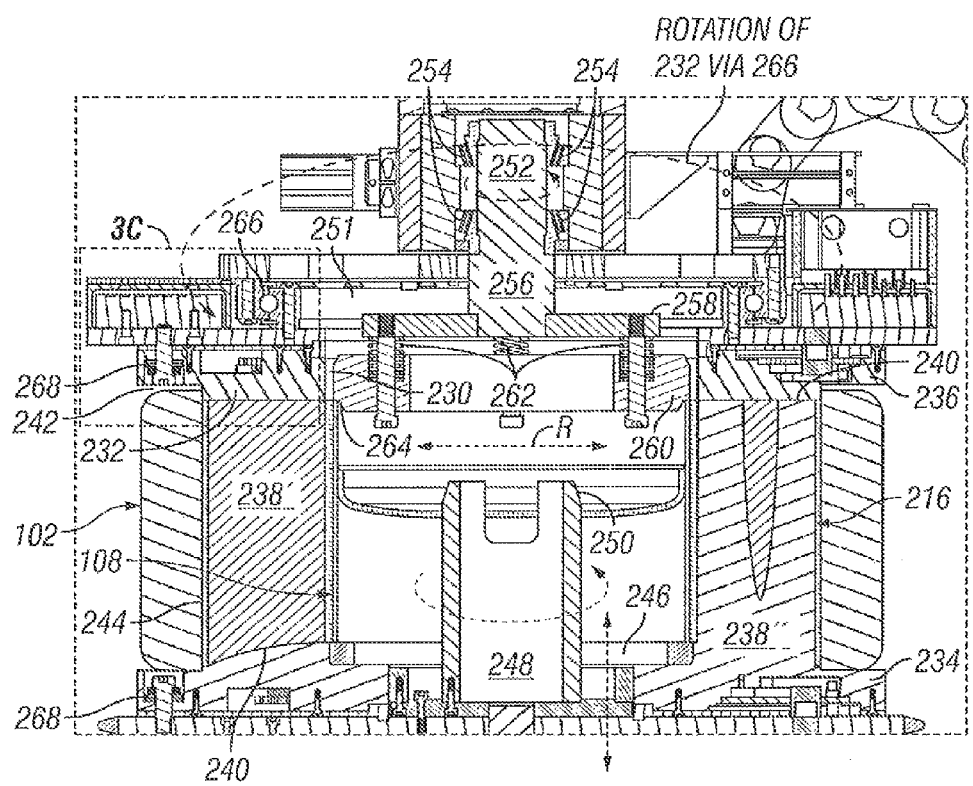
FIG. 3B is an enlarged view of the mold and top portion of the molding apparatus of FIG. 3A.
Figure 3C:
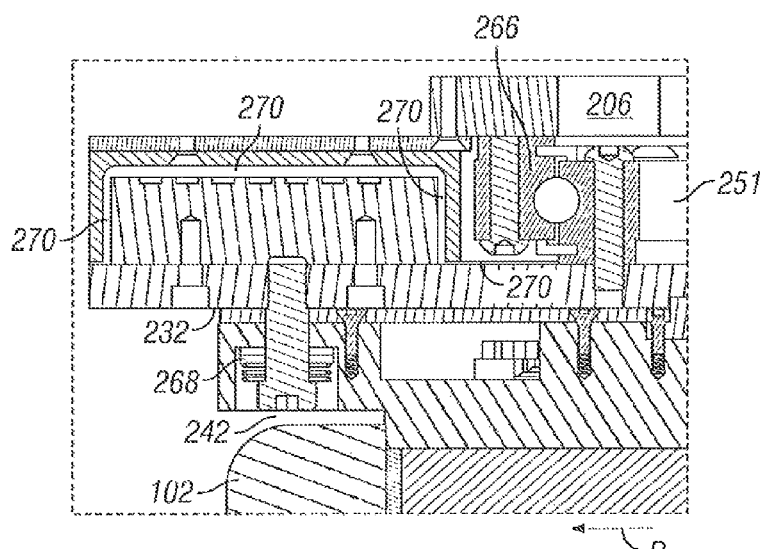
FIG. 3C is an enlarged view taken from FIG. 3B to more clearly show the gap found between the upper platen of the molding press and outer ring assembly of the top portion of the mold.

Looking at FIGS. 3 thru 3C, an apparatus 200 for molding a portion of a tire 100 in a manner consistent with one embodiment of the present invention is depicted. Specifically as best seen in FIGS. 3 and 3A, this apparatus 200 includes a vertical molding press 202 comprising a lower platen 204, upper platen 206, hydraulic cylinder 208, arm 210, a gear 212 and frame 214. The frame 214 is fixed and the lower platen 204 is translatably fixed in a horizontal plane but is free to translate vertically while the upper platen 206 is pivotally connected to the frame 214 via pin 211. The upper platen 206 is moved by the hydraulic cylinder 208 in and out of a parallel alignment with the lower platen 204. The gear 212 mates with a drive pinion (not shown) powered by a motor (not shown) that can engage and disengage the gear 212 when it is appropriate to rotate the lower platen 204 and mold 216, which is affixed thereto, to form the spokes 106 as will be explained later. It is contemplated that the upper platen 206 could be translatably connected to the frame 214 and could be moved by means other than hydraulic, such as pneumatic, mechanical or other means commonly known in the art. Likewise, the rotation of the lower platen 204 could be achieved by way of other means known in the art such as by an electric motor that is directly coupled to the shaft 218 to which the lower platen 204 is attached. The translation of the lower platen can be achieved using the same methods mentioned previously for moving the upper platen 206. Roller bearings 220 are also provided to guide the rotation of the lower platen 204 and to minimize the friction associated with its rotation.

The top view provided by FIG. 3 depicts how the upper platen 206 is attached to the frame 214 using the arm 210 in an effective manner requiring as little material as possible. The upper platen 206 has a generally thin cylindrical shape that is split into a central portion 222 and an outer annular portion 224. The arm 210 of the molding press 202 extends horizontally from the frame 214 and down a small distance vertically to connect to the central portion 222 of the top platen 206. Five slender connecting members 226, arranged in a circular array, extend from the central portion 222 and connect to the outer annular portion 224. The inner and outer portions 222, 224 of the top platen 206 are configured concentrically with five openings 228 found between them and the connecting members, one of which is above the pouring slot 230. How these features are used in filling the mold will be discussed in more detail later.

It is contemplated that the construction of the top platen and its attachment to the frame of the molding press could be achieved in other ways. For example, separate nuns could be used to connect the inner and outer portions of the top platen to the frame of the molding press. Also, the openings found on top surface of the upper platen could be replaced by a single aperture that extends through the side surface of the mold platen or through a side surface of the mold far enough to reach the pouring slot.

Focusing now on FIGS. 3B and 3C, details of the mold 216 are more clearly shown. The mold 216 includes a lower portion 234 and an upper portion 236 that each have cores 238 that interarticulate to define the cavities that form the spokes 106 as the cores extend from one side of the mold to the other in an alternating fashion around the circumference of the mold, similar to the previous mold design. This is illustrated best in FIG. 311 where diametrically opposing cores are shown with core 238 on the left side of the figure extending from the top portion 236 of the mold 216 and core 238" on the right side of the figure extending from the bottom portion 234 of the mold 212. The cores 238 shut off on slightly contoured surfaces 240, but it is contemplated that they could extend into the opposing mold half in a telescoping manner. Other common mold features such as vents and mold alignment components are not discussed here as they are not important to the present invention, but are often used. The cores are shown as solid extensions of the mold halves, hut they could be separate inserts for ease of replacement should one of them be damaged.

The tread 102 of the tire 100 is placed in an annular groove 242 found along the circumferential surface of the mold 216 after the mold is opened by pivoting the upper platen 206 up and away from the lower platen 204 and the lower platen is translated downward to a middle position. A slight interference (not clearly shown) is provided near the bottom of the annular groove 242 between the tread 102 and cores 238 so that as a robotic arm places a tread into the mold, it can press the tread onto the core causing a small press fit locally, which tends to keep the tread 102 seated during the molding process. A clearance groove 244 is also provided along the outside surfaces of the cores 238 in order to allow the flow of polyurethane along the inside surface of the tread 102, facilitating the bonding of the spokes 106 to the tread 102. At about the same time as the tread 102 is positioned into the bottom portion 234 of the mold 216, the hub 108 is situated in a pocket 246 found in the center of the mold 216 by a robotic arm or other means commonly known in the at and is guided into place by a sleeve 248 having a lead-in surface 250.

The upper mold portion 236 comprises a rotating cap assembly 252 that is rotatably attached to the mold press 202 and is guided by roller bearings 254. The roller bearings 254 used in this case are model numbers 42687/42620 sold by SIMPLY BEARINGS LTD. (SKF). Of course, other rotatable attachments are feasible such as a journal bearing or magnetic bearing depending on the application provided they allow this assembly to rotate freely. A gap 251 is provided between the press 202 and this assembly 252 to limit the amount of friction created as the assembly rotates. This rotating cap assembly 252 includes a shall 256 that is guided by the bearings and that has a flange 258 attached to its bottom end. A cap 260 is connected below the flange 258 by at least one, and sometimes four, bolt and compression spring subassemblies 262. The cap 260 has a chamfer 264 located on its bottom edge for properly aligning the cap 260 to the hub 108 as the upper platen of the molding press pivots downward into a parallel alignment with the lower platen and the lower platen translates upward to its top position where the mold is closed. Now, the chamfered portion of the cap 260 extends down past the topmost part of the hub 108 and into its interior as shown by FIG. 3B.

The bolt and compression spring subassemblies 262 serve three basic functions. First, they allow the position of the cap 260 to adjust vertically, compensating for height variances of the hub 108 caused by machining tolerances, temperature expansion, etc., because the compression spring is trapped between the flange 258 and cap 260. Thus, it urges the cap downward in a resilient manner. This can avoid damage to the hub and/or cap when the hub is taller than expected. Second, the biasing force of the springs keeps the cap 260 and hub 108 down as the mold 216 initially opens, which occurs by lowering the lower platen 204, helping keep the tire 100, which is connected to the hub 108 through the newly formed spokes 106, in a seated position within the lower portion 234 of the mold 216. This avoids having the tire 100 stick to the upper portion 236 of the mold 216, which is undesirable for reasons set forth above. Third, it is desirable for the cap 260 to remain in contact with the huh 108 at all times during the molding process, rotating therewith, for the purpose of preventing flash from seeping between the hub 108 and cap 260.

Therefore, springs that provide enough force should be used. For this embodiment, compression springs sold by DAYTON PROGRESS CORPORATION under model number M150-200 can be used. In other embodiments, some other means for biasing the cap could be used such as hydraulic or pneumatic cylinders, weight of the cap itself, magnetism or some other type of standard mold mechanism such as latch looks. Similar to a rotating clutch, enough friction should be generated between the hub 108 and the cap 260 to cause the cap 260 to be driven by the hub 108. So creating surface friction at the interface between the hub and cap may be wanted by varying surface finishes, increasing surface area or by other means known in the art. Alternatively, structural locking; features can be provided at the interface between the cap and hub to help ensure that the rotation of the hub is imparted to the cap. In like fashion, these same principles may be applied at the interface between the hub 108 and the lower portion 234 of the mold 216.

In addition, the upper portion 236 of the mold 216 includes an outer ring assembly 232 that is rotatably attached to the upper platen 206 of the molding press 202 using a large diameter stewing bearing 266 that is found outside of the pouring slot 230 in a radial direction R of the mold (consistent with the coordinate axes of a tire that is contained within the mold). Other rotatable attachments can be used in lieu of the stewing bearing such as a journal bearing or magnetic bearing depending on the application provided that they reduce the amount of resistance to rotation, i.e. friction, a suitable amount. Also, materials such as bronze or plastic may be used to create a rotating attachment where these materials that have a low coefficient of friction slide against one another. For this embodiment, a stewing bearing sold by SCHAEFFLER TECHNOLOGIES GmbH & Co. KG—(INA) under model no, VSU 200544 is used.

As best seen in FIG. 3C, there is a small gap 270 found between the majority of the upper platen 206 of the molding press 202 and the outer ring assembly 232, which provides clearance as the outer ring assembly 232 rotates on the stewing bearing 266. However, this gap 270 severely limits the amount of heat that can be transferred from the mold 216 to the upper platen 206 of the press 202. This leads to temperature drift of the outer ring assembly 232, which is made of aluminum and steel that have different coefficients of thermal expansion. This means that portions of the outer ring assembly can grow different amounts. Hence, conventional bated joints for holding these different portions of the outer ring assembly are impractical as bolts tightened when the mold is in a cold state may snap as the mold heats up.

Accordingly, compression springs 268 or alternatively disk springs are provided between the head of the bolt and the bottom surface of the counterbore in which the head of the bolt is found, allowing the spring to absorb the effects of thermal expansion and to prevent snapping of the bolt. A similar technique is used to attach the lower portion 234 of the mold 216 to the lower platen 204 for the same reason. For this version of the mold, disk springs sold by VALLEY SPRING CO. LTD. under model no. P381193515 can be used.

Again, it is desired that the rotation of the bottom portion 234 of the mold 216 be conveyed to the outer ring assembly 232 by some sort of coupling between the outer ring assembly 232 and the bottom portion 234 of the mold 216. Otherwise, the cores of the outer ring assembly 232 may crash into the cores of the lower portion 234 of the mold 216 and/or the thickness of the spokes will not be consistent. This coupling may be accomplished through friction or through structural interlocking features such as cores that telescope from one mold half into the opposing mold half and/or mold alignment features such as taper pins. It should be noted that the rotatable attachments of the outer ring assembly 232 and the cap assembly 252 of the upper mold half are separate from each other so each assembly is free to rotate independently of the other assembly.

Turning hack to FIG. 3, when the mold 216 is closed, and rotating, a nozzle (not shown) can be positioned above the opening 228 of the top platen 206 and pouring slot 230 of the mold 216 for introducing a liquid such as polyurethane into the mold 216. As can be seen from the above cited structure, the rotatable and concentric attachment of the cap 260 and outer ring assembly 232 to the molding press 202 along with the small gap provided between the cap and outer ring, which acts as a pouring slot 230, allows these components to rotate and spread a liquid such as polyurethane to form the spokes of the tire without interrupting the fill of the mold by some structural feature that is also rotating. This avoids the waste of polyurethane as it is diverted from entering the mold and also helps all the spokes to be formed consistently and uniformly without the formation of bubbles that are introduced into the polyurethane by the turbulence caused by the rotation of a structural component that interrupts the flow of the polyurethane into the mold.

Once a tire 100 has spokes bonded to the hub 108 and tread 102 in the mold 216, the lower platen 204 may be translated downward to a bottom position where pins (not shown), which are attached to the floor below the lower platen of the press, may pass through holes in the lower platen and in the tower portion 234 of the mold 216 and push on the bottom of the tread 102, causing the tire to rise and demold from the cores that extend from the bottom portion of the mold. Alternatively, an ejection system could be actuated that pushes the tire out of the mold without moving the lower platen past its middle vertical position mentioned earlier where the tread is placed into the mold. At about this time, the upper platen 206 is rotated out of the way, creating enough space for the robotic arm to pick up the tire. The process for adding the spokes to another tire can now begin if desired.

While only a tread that is formed with spokes that is part of a non-pneumatic tire has been specifically described herein, it is contemplated that this process could be used with tires that use a gas along with spokes (often referred to as a hybrid tire) to support the load applied to the tire. The tire does not need to be configured with a shear layer or have other properties or features as the tire contained in U.S. Pat. No. 7,201,194. Also, other materials may be used instead of polyurethane such as any thermosetting material that is suitably durable and strong to support the loads applied to the tire. Furthermore, the embodiments discussed herein focused on adding spokes to the tire but the present invention is also applicable to forming other regions of a tire.

While this invention has been described with reference to particular embodiments thereof, it shall be understood that such description is by way of illustration and not by way of limitation. For example, a vertical molding press has been described but it is contemplated that a horizontal melding press could also be used, in like fashion, the meld has been described as having a cylindrical shape, but it could have other shapes such as a square or rectangular cube. In addition, a single motor that drives the lower portion of the mold that is coupled to upper portions of the mold has been described, but it is contemplated that the motor could drive one of the upper portions of the mold and the remaining portions of the mold could be driven through coupling similar to what has been described. In some instances, separate motors could be used to drive each portion of the mold that is separately and rotatably attached to the apparatus. Virtually, any combination of motor(s) driving the rotation of any combination of mold portion(s) may be used with the present invention provided the cap, outer ring and the mold portion opposing them have separate rotatable attachments to the apparatus. However, in such as ease coupling of the various portions of the mold to each other may be undesirable and the timing of the motors has to be extremely accurate. Finally, different aspects and features of some of the embodiments discussed herein may be substituted for other features of other embodiments to yield further embodiments. Accordingly, the scope and content of the invention to be defined only by the terms of the appended claims.

What is claimed is:

1. An apparatus for molding a portion of a tire having a radial direction that includes a molding press and a mold, said apparatus further comprising:

first and second platens, said platens being operatively associated with said press for changing their position relative to each other for opening and closing a mold that is attached to said platens, said second platen being rotatably attached to the apparatus;

a first portion of the mold that is attached to the first platen of the molding press and a second portion of the mold that is attached to the second platen of the molding press wherein the first portion of the mold further comprises a cap that is rotatably attached to the apparatus and an outer ring that is also rotatably attached to the apparatus, said rotating cap and outer ring being arranged concentrically with each other with a gap between them that provides a pouring slot, said cap having a rotatable attachment that is separate from that of said outer ring and said pouring slot being accessible from the exterior of the apparatus when the mold is closed; and a motor that is operatively associated with a portion of the mold for making said portion of the mold rotate.

2. The apparatus of claim 1, wherein the motor drives the second portion of the mold and the cap and outer ring of the first portion of the mold are coupled to the second portion of the mold when the mold is closed, causing the first portion of the mold to rotate.

3. The apparatus of claim 2, wherein said apparatus further comprises a gear that is attached to the second platen and a pinion that is driven by the motor, said pinion being meshed with said gear for making the mold rotate.

4. The apparatus of claim 1, further comprising a slewing bearing that rotatably attaches the outer ring to the first platen of the molding press.

5. The apparatus of claim 1, wherein the outer ring is rotatably attached to the apparatus radially outside of the pouring slot.

6. The apparatus of claim 1, further comprising roller bearings that rotatably attach the second platen and cap to the apparatus.

7. The apparatus of claim 1, further comprising means for biasing the cap toward the second portion of the mold.

8. The apparatus of claim 7, wherein the means for biasing the cap includes a spring.

9. The apparatus of claim 1, wherein at least one of said mold portions has a load bearing surface and the apparatus further comprises a disc spring and a bolt with a head wherein the disc spring is trapped under the head of the bolt and presses on the load bearing surface.

10. The apparatus of claim 1, wherein said molding press is a vertical molding press, said first platen is an upper platen, said second platen is a lower platen and wherein said upper platen includes an opening that is above said pouring slot when the mold is closed.

11. The apparatus of claim 2, further comprising taper pins that couple the first mold portion to the second mold portion when the mold is closed.

12. The apparatus of claim 10, wherein said upper platen is pivotally connected to the molding press and said lower platen is translatably connected to the molding press in a vertical direction.

13. The apparatus of claim 12, which further comprises ejection pins that are attached to a floor below the lower platen and pass through the lower portion of the mold to eject the tire from the mold.

14. The apparatus of claim 1, which further comprises a nozzle that is positioned proximate said pouring slot for introducing a fluid into the mold.

15. The apparatus of claim 10, wherein said molding press further comprises a frame and an arm that extends from the frame and wherein said upper platen includes a central portion and an outer annular portion and the central portion is connected to the arm, said apparatus further comprising a connecting member that connects the outer annular portion to the central portion of the upper platen.

\* \* \* \* \*